(12) United States Patent
Li

(10) Patent No.: US 9,049,060 B2
(45) Date of Patent: Jun. 2, 2015

(54) CO-CHANNEL DUAL POLARIZED MICROWAVE DEVICE AND METHOD FOR RECEIVING RECEIVE SIGNAL

(71) Applicant: Huawei Technologies Co., Ltd., Shenzhen (CN)

(72) Inventor: Jun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/279,048

(22) Filed: May 15, 2014

(65) Prior Publication Data

US 2014/0247863 A1     Sep. 4, 2014

Related U.S. Application Data

(63) Continuation of application No. PCT/CN2011/082231, filed on Nov. 15, 2011.

(51) Int. Cl.

| | |
|---|---|
| *H03D 1/06* | (2006.01) |
| *H04L 27/01* | (2006.01) |
| *H04B 7/10* | (2006.01) |
| *H04W 52/02* | (2009.01) |
| *H04L 7/04* | (2006.01) |
| *H04B 7/00* | (2006.01) |
| *H04B 7/08* | (2006.01) |
| *H04W 56/00* | (2009.01) |

(52) U.S. Cl.
CPC *H04L 27/01* (2013.01); *H04B 7/10* (2013.01); *H04W 56/00* (2013.01); *H04W 52/0232* (2013.01); *H04L 7/04* (2013.01); *H04B 7/002* (2013.01); *H04B 7/0817* (2013.01)

(58) Field of Classification Search
USPC .................. 375/346, 350, 233; 342/188, 361
See application file for complete search history.

(56) References Cited

U.S. PATENT DOCUMENTS

| | | | | |
|---|---|---|---|---|
| 5,844,950 | A * | 12/1998 | Aono et al. | 375/346 |
| 8,081,699 | B2 * | 12/2011 | Siwiak et al. | 375/267 |
| 8,396,177 | B1 * | 3/2013 | Morris | 375/346 |
| 8,615,061 | B2 * | 12/2013 | Petrovic et al. | 375/350 |
| 8,744,031 | B1 * | 6/2014 | Kim et al. | 375/371 |

(Continued)

FOREIGN PATENT DOCUMENTS

| | | |
|---|---|---|
| CN | 101800678 | 8/2010 |
| EP | 0553873 A1 | 8/1993 |

(Continued)

*Primary Examiner* — Eva Puente
(74) *Attorney, Agent, or Firm* — Slater & Matsil, L.L.P.

(57) ABSTRACT

Embodiments of the present invention disclose a co-channel dual polarized microwave device and a method. Frame synchronization is performed on a first receive signal processed by cross polarization interference cancellation and phase noise immunization is performed on the first receive signal processed by frame synchronization. Frame synchronization is performed on a second receive signal not processed by cross polarization interference cancellation and phase noise immunization is performed on the second receive signal processed by frame synchronization. The first receive signal processed by phase noise immunization and the second receive signal processed by phase noise immunization are selectively received according to a frame synchronization state signal and a signal quality signal. Delay alignment is performed on a selectively received signal according to the frame synchronization state signal to implement lossless switching in a selective receiving process.

12 Claims, 4 Drawing Sheets

(56) References Cited

U.S. PATENT DOCUMENTS

2002/0061752 A1    5/2002  Kurokami
2003/0161419 A1*   8/2003  Bach et al. .................. 375/346
2009/0143042 A1*   6/2009  Kawai .......................... 455/296
2012/0315865 A1   12/2012  Zhang
2013/0034196 A1*   2/2013  Vann ............................ 375/350

FOREIGN PATENT DOCUMENTS

| EP | 0570166 A1 | 11/1993 |
| EP | 1365519 A1 | 11/2003 |
| JP | 1993291970 A | 11/1993 |
| JP | 2000165339 A | 6/2000 |
| JP | 2004260351 A | 9/2004 |

\* cited by examiner

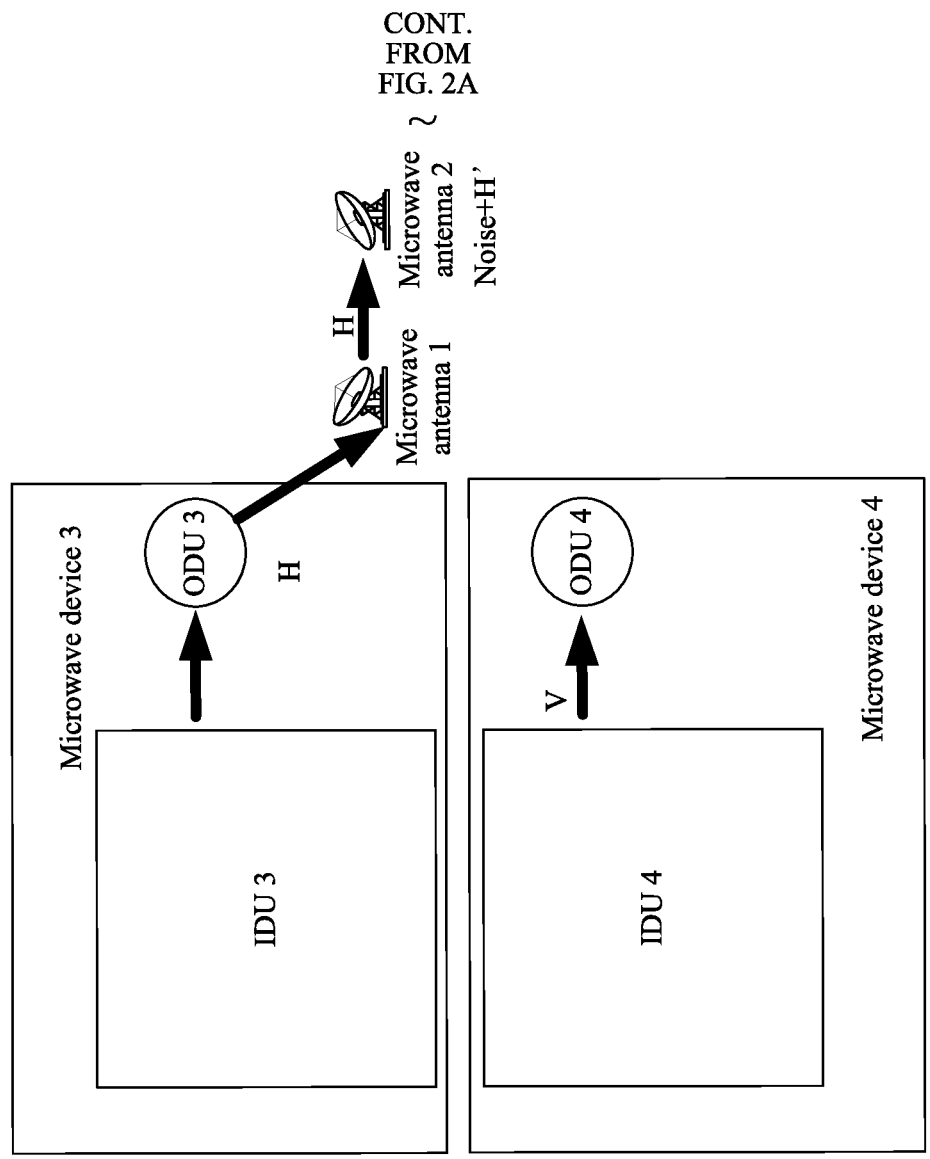

ns and, in particular embodiments, to a co-channel dual
CO-CHANNEL DUAL POLARIZED MICROWAVE DEVICE AND METHOD FOR RECEIVING RECEIVE SIGNAL This application is a continuation of International Application No. PCT/CN2011/082231, filed on Nov. 15, 2011, which is hereby incorporated by reference in its entirety.

TECHNICAL FIELD

The present invention relates to the field of wireless technologies and, in particular embodiments, to a co-channel dual polarized microwave device and a method for receiving a receive signal.

BACKGROUND

A microwave technology transmits data directly through space, requiring no optical fiber or cable and having an obvious engineering advantage in a city, a remote area, or a special area such as a river. The microwave technology features convenient networking, a flexible use manner, and short service deployment time. As the microwave technology develops, a cost of a microwave device decreases gradually. Therefore, the microwave technology is more and more widely applied.

A co-channel dual polarization (CCDP) transmission technology may implement simultaneous transmission of two orthogonal polarized waves, that is, a horizontal polarized (H) wave and a vertical polarized (V) wave, within the same channel in the space, thereby doubling the service transmission capacity of a single channel. Because a dual polarized signal is affected by a characteristic of a dual-polarized antenna and a spatial transmission environment during transmission, H and V signals reaching a receiver are not completely orthogonal, that is, an H receiver receives a component V' of the V signal, which causes co-channel interference and may cause a demodulation failure of the receiver in a severe case.

In the prior art, a cross polarization interference cancellation (XPIC) technology is used to eliminate polarization interference by means of interference signal cancellation. In an H direction, for example, a receiving side uses a signal mutually transmitted in a V direction of an XPIC working group to cancel a co-channel interference signal V' in a receive signal (H+V') to ensure correct parsing of data in the H direction.

The XPIC working group requires mutual coordination between a sending device and a receiving device in the H and V directions. If one microwave device in the working group is faulty, for example, an indoor unit (IDU) or an outdoor unit (ODU) is faulty, services of the entire XPIC working group may be interrupted.

SUMMARY OF THE INVENTION

Embodiments of the present invention provide a co-channel dual polarized microwave device and a method for receiving a receive signal, which are used to solve the problem of service interruption of an entire XPIC working group due to a failure of a microwave device in the XPIC working group in the prior art.

An embodiment of the present invention provides a co-channel dual polarized microwave device. A first equalization unit is configured to receive a first receive signal that is a receive signal processed by cross polarization interference cancellation, to perform frame synchronization on the first receive signal to acquire a first frame synchronization state signal and the first receive signal processed by frame synchronization, to perform phase noise immunization on the first receive signal processed by frame synchronization, to perform quality evaluation on the first receive signal processed by phase noise immunization to acquire a first signal quality signal, and to send the first frame synchronization state signal, the first signal quality signal, and the first receive signal processed by phase noise immunization to a synchronization synthesis unit. A second equalization unit is configured to receive a second receive signal that is a receive signal not processed by cross polarization interference cancellation, to perform frame synchronization on the second receive signal to acquire a second frame synchronization state signal and the second receive signal processed by frame synchronization, to perform phase noise immunization on the second receive signal processed by frame synchronization, to perform quality evaluation on the second receive signal processed by phase noise immunization to acquire a second signal quality signal, and to send the second frame synchronization state signal, the second signal quality signal, and the second receive signal processed by phase noise immunization to the synchronization synthesis unit. The synchronization synthesis unit is configured to selectively receive, according to the first frame synchronization state signal, the first signal quality signal, the second frame synchronization state signal, and the second signal quality signal, the first receive signal processed by phase noise immunization and the second receive signal processed by phase noise immunization, and to perform delay alignment on a selectively received signal according to the first frame synchronization state signal and the second frame synchronization state signal to implement lossless switching in a selective receiving process.

An embodiment of the present invention provides a method for receiving a co-channel dual polarized receive signal. A first receive signal is a receive signal processed by cross polarization interference cancellation. Frame synchronization is performed on the first receive signal to acquire a first frame synchronization state signal and the first receive signal processed by frame synchronization. Phase noise immunization is performed on the first receive signal processed by frame synchronization and quality evaluation is performed on the first receive signal processed by phase noise immunization to acquire a first signal quality signal. A second receive signal is a receive signal not processed by cross polarization interference cancellation. Frame synchronization is performed on the second receive signal to acquire a second frame synchronization state signal and the second receive signal processed by frame synchronization. Phase noise immunization is performed on the second receive signal processed by frame synchronization. Quality evaluation is performed on the second receive signal processed by phase noise immunization to acquire a second signal quality signal. The first signal quality signal, the second frame synchronization state signal, and the second signal quality signal, the first receive signal processed by phase noise immunization and the second receive signal processed by phase noise immunization are selectively received according to the first frame synchronization state signal. Delay alignment is performed on a selectively received signal according to the first frame synchronization state signal and the second frame synchronization state signal to implement lossless switching in a selective receiving process.

In the embodiments of the present invention, a first receive signal is a receive signal processed by cross polarization interference cancellation, frame synchronization is performed on the first receive signal to acquire a first frame synchronization state signal and the first receive signal processed by frame synchronization. Phase noise immunization is performed on the first receive signal processed by frame synchronization. Quality evaluation is performed on the first receive signal processed by phase noise immunization to acquire a first signal quality signal; a second receive signal is received. The second receive signal is a receive signal not processed by cross polarization interference cancellation, frame synchronization is performed on the second receive signal to acquire a second frame synchronization state signal and the second receive signal processed by frame synchronization. Phase noise immunization is performed on the second receive signal processed by frame synchronization. Quality evaluation is performed on the second receive signal processed by phase noise immunization to acquire a second signal quality signal; and the first receive signal processed by phase noise immunization and the second receive signal processed by phase noise immunization are selectively received according to the first frame synchronization state signal, the first signal quality signal, the second frame synchronization state signal, and the second signal quality signal, and delay alignment is performed on a selectively received signal according to the first frame synchronization state signal and the second frame synchronization state signal to implement lossless switching in a selective receiving process. The second receive signal is a receive signal not processed by cross polarization interference cancellation. If a cross polarization interference cancellation error occurs due to a microwave device fault, a microwave device selectively receives the receive signal not processed by cross polarization interference cancellation and performs delay alignment, thereby implementing lossless switching in the selective receiving process.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2A and FIG. 2B are a schematic structural diagram of another co-channel dual polarized microwave device according to an embodiment of the present invention.

DETAILED DESCRIPTION OF ILLUSTRATIVE EMBODIMENTS

The following describes specific embodiments of the present invention with reference to the accompanying drawings.

Figure 1:
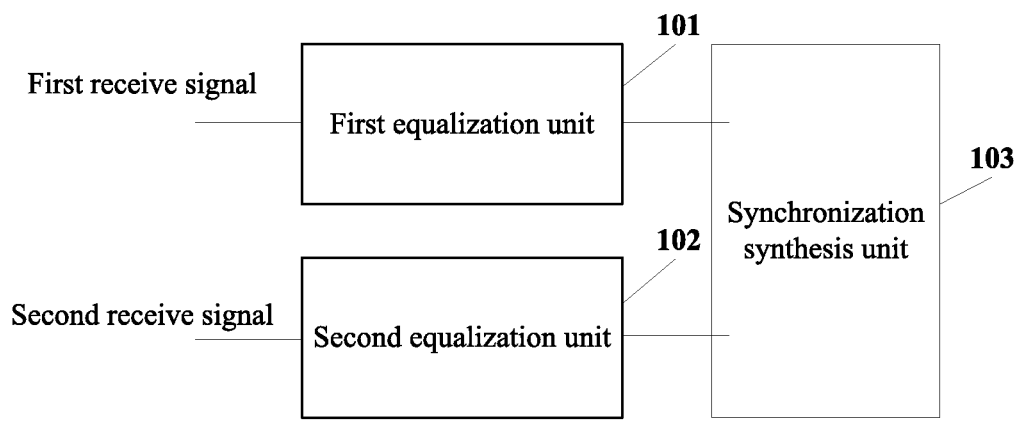
FIG. 1 is a schematic structural diagram of a co-channel dual polarized microwave device according to an embodiment of the present invention.

FIG. 1 is a schematic structural diagram of a co-channel dual polarized microwave device according to an embodiment of the present invention. A first equalization unit 101 is configured to receive a first receive signal. The first receive signal is a receive signal processed by cross polarization interference cancellation. The unit 101 is also configured to perform frame synchronization on the first receive signal to acquire a first frame synchronization state signal and the first receive signal processed by frame synchronization, perform phase noise immunization on the first receive signal processed by frame synchronization, to perform quality evaluation on the first receive signal processed by phase noise immunization to acquire a first signal quality signal, and to send the first frame synchronization state signal, the first signal quality signal, and the first receive signal processed by phase noise immunization to a synchronization synthesis unit.

A second equalization unit 102 is configured to receive a second receive signal, that is a receive signal not processed by cross polarization interference cancellation. The second unit 102 is also configured to perform frame synchronization on the second receive signal to acquire a second frame synchronization state signal and the second receive signal processed by frame synchronization, to perform phase noise immunization on the second receive signal processed by frame synchronization, to perform quality evaluation on the second receive signal processed by phase noise immunization to acquire a second signal quality signal, and to send the second frame synchronization state signal, the second signal quality signal, and the second receive signal processed by phase noise immunization to the synchronization synthesis unit.

The synchronization synthesis unit 103 is configured to selectively receive, according to the first frame synchronization state signal, the first signal quality signal, the second frame synchronization state signal, and the second signal quality signal, the first receive signal processed by phase noise immunization and the second receive signal processed by phase noise immunization, and to perform delay alignment on a selectively received signal according to the first frame synchronization state signal and the second frame synchronization state signal to implement lossless switching in a selective receiving process.

If the microwave device is used to receive a horizontal polarized wave, the first equalization unit is configured to perform horizontal polarization H frame synchronization on the first receive signal and the second equalization unit is configured to perform horizontal polarization H frame synchronization on the second receive signal.

If the first equalization unit fails to perform horizontal polarization H frame synchronization on the first receive signal and the second equalization unit fails to perform horizontal polarization H frame synchronization on the second receive signal, the second equalization unit performs vertical polarization V frame synchronization on the second receive signal; and if synchronization is successful, a sending function of the microwave device is disabled.

If the microwave device is used to receive a vertical polarized wave, the first equalization unit is specifically configured to perform vertical polarization V frame synchronization on the first receive signal and the second equalization unit is specifically configured to perform vertical polarization V frame synchronization on the second receive signal.

If the first equalization unit fails to perform vertical polarization V frame synchronization on the first receive signal and the second equalization unit fails to perform vertical polarization V frame synchronization on the second receive signal, the second equalization unit performs horizontal polarization H frame synchronization on the second receive signal; and if synchronization is successful, the sending function of the microwave device is disabled.

In the embodiment of the present invention, a first receive signal is received, where the first receive signal is a receive signal processed by cross polarization interference cancellation. Frame synchronization is performed on the first receive signal to acquire a first frame synchronization state signal and the first receive signal processed by frame synchronization. Phase noise immunization is performed on the first receive signal processed by frame synchronization. Quality evaluation is performed on the first receive signal processed by phase noise immunization to acquire a first signal quality signal; the second receive signal is received. The second receive signal is a receive signal not processed by cross polarization interference cancellation, frame synchronization is performed on the second receive signal to acquire a second frame synchronization state signal and the second receive signal processed by frame synchronization, phase noise immunization is performed on the second receive signal processed by frame synchronization, and quality evaluation is performed on the second receive signal processed by phase noise immunization to acquire a second signal quality signal. The first receive signal processed by phase noise immunization and the second receive signal processed by phase noise immunization are selectively received according to the first frame synchronization state signal, the first signal quality signal, the second frame synchronization state signal, and the second signal quality signal, and delay alignment is performed on a selectively received signal according to the first frame synchronization state signal and the second frame synchronization state signal to implement lossless switching in a selective receiving process.

The second receive signal is a receive signal not processed by cross polarization interference cancellation. If a cross polarization interference cancellation error occurs due to a microwave device fault, a microwave device selectively receives the receive signal not processed by cross polarization interference cancellation and performs delay alignment, thereby implementing lossless switching in the selective receiving process. A frame synchronization state is used to determine whether a corresponding peer device is faulty. If the corresponding peer device is faulty, a sending function of the device is disabled to ensure that another peer device can work normally.

Figure 2A:
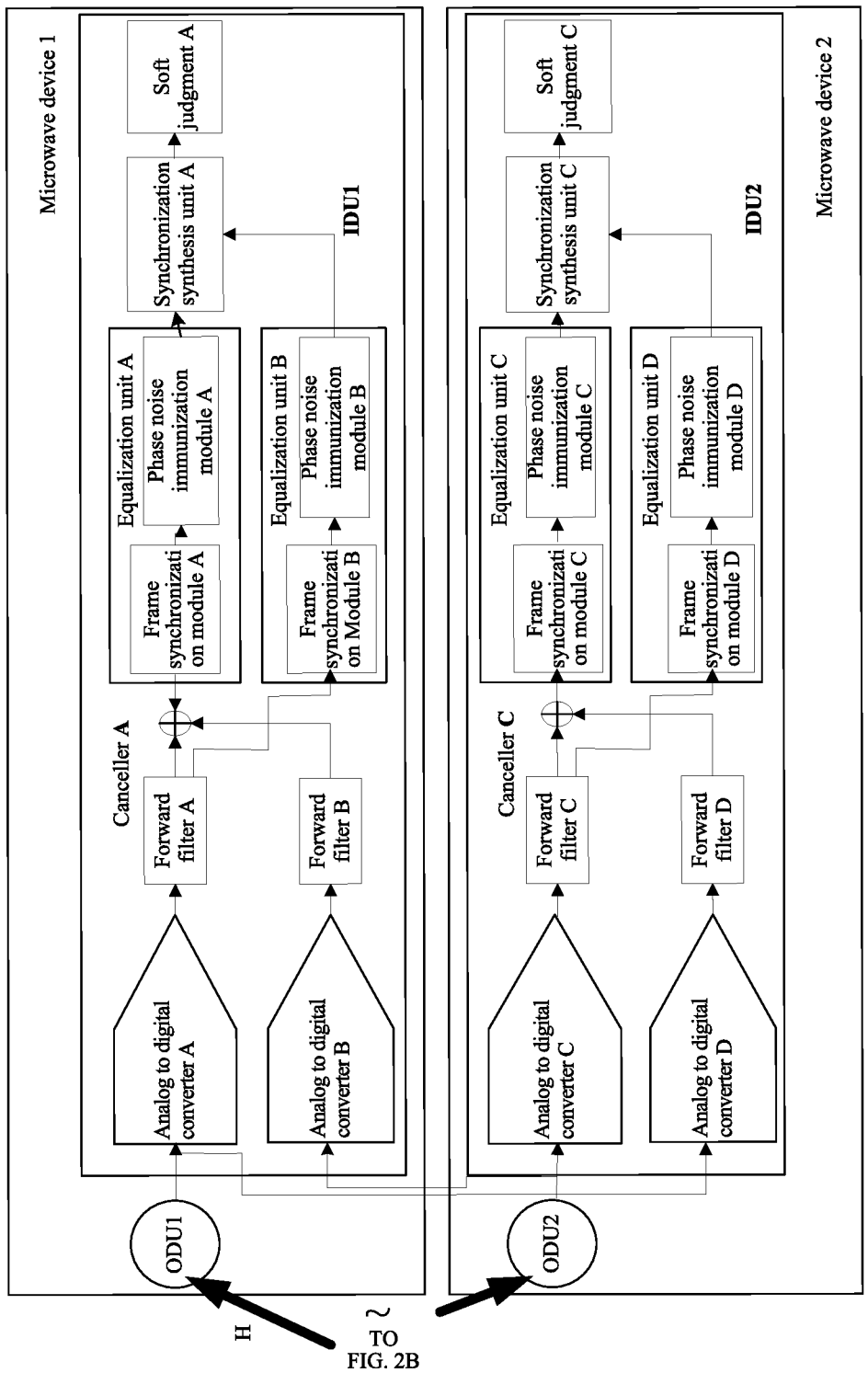

FIG. 2A and FIG. 2B are a schematic structural diagram of another co-channel dual polarized microwave device according to an embodiment of the present invention.

As shown in FIG. 2A and FIG. 2B, the microwave device includes a microwave device 1, a microwave device 2, a microwave device 3, and a microwave device 4. The microwave device in the embodiment of the present invention includes an indoor unit (IDU) and an outdoor unit (ODU), or may be an integrated microwave device in other embodiments. The microwave device 1 includes an IDU 1 and an ODU 1. The microwave device 2 includes an IDU 2 and an ODU 2. The microwave device 3 includes an IDU 3 and an ODU 3. The microwave device 4 includes an IDU 4 and an ODU 4. The microwave device 1 is configured to send and receive an H polarized wave through a microwave antenna 2. The microwave device 3 is configured to send and receive an H polarized wave through a microwave antenna 1. The microwave device 2 is configured to send and receive a V polarized wave through the microwave antenna 2. The microwave device 4 is configured to send and receive a V polarized wave through the microwave antenna 1.

The following uses the microwave device 3 and the microwave device 4 that send a polarized wave and the microwave device 1 and the microwave device 2 that receive a polarized wave as examples. The microwave device 3 sends an H polarized wave and the microwave device 4 sends a V polarized wave. A signal received by the microwave device 1 includes the H polarized wave and a co-channel interference signal V', that is, H+V'. A signal received by the microwave device 2 includes the V polarized wave and a co-channel interference signal H', that is, V+H'. The microwave device 1 and the microwave device 2 send the received signal to each other and use the mutually sent signal to perform cross polarization interference cancellation.

The microwave device 1 is used as an example. An analog to digital converter A receives a signal from the ODU 1 and an analog to digital converter B receives a signal from the ODU 2. After the two signals pass through a forward filter A and a forward filter B respectively, cross polarization interference cancellation is performed by a canceller A to acquire a first receive signal after cross polarization interference cancellation. A frame synchronization module A performs horizontal polarization H frame synchronization on the first receive signal to acquire a first frame synchronization state signal and the first receive signal processed by frame synchronization. A phase noise immunization module A performs phase noise immunization on the first receive signal processed by frame synchronization to cancel phase noise. Quality evaluation is performed on the first receive signal processed by phase noise immunization to acquire a first signal quality signal.

The first frame synchronization state signal, the first signal quality signal, and the first receive signal processed by phase noise immunization are sent to a synchronization synthesis unit A. The analog to digital converter A receives a signal from the ODU 1, and the signal is processed by the forward filter A to acquire a second receive signal. A frame synchronization module B performs horizontal polarization H frame synchronization on the second receive signal to acquire a second frame synchronization state signal and the second receive signal processed by frame synchronization.

A phase noise immunization module B performs phase noise immunization on the second receive signal processed by frame synchronization to cancel the phase noise. Quality evaluation is performed on the second receive signal processed by phase noise immunization to acquire a second signal quality signal. The second frame synchronization state signal, the second signal quality signal, and the second receive signal processed by phase noise immunization are sent to the synchronization synthesis unit A.

The synchronization synthesis unit A selectively receives, according to the first frame synchronization state signal, the first signal quality signal, the second frame synchronization state signal, and the second signal quality signal, the first receive signal processed by phase noise immunization and the second receive signal processed by phase noise immunization, and performs delay alignment on a selectively received signal according to the first frame synchronization state signal and the second frame synchronization state signal to implement lossless switching in a selective receiving process. In a normal case, the synchronization synthesis unit A selects a signal from an equalization unit A.

In the normal case, the signal that the analog to digital converter A receives from the ODU 1 is H+V' and the signal that the analog to digital converter B receives from the ODU 2 is V+H'. The signal processed by cross polarization interference cancellation is of good quality after it is processed by the equalization unit A, and is selectively received by the synchronization synthesis unit A.

If the microwave device 4 is faulty, that is, the IDU 4 or the ODU 4 may be faulty, the signal received by the microwave device 1 is an H polarized wave and the signal received by the microwave device 2 is an H' polarized wave and noise. The analog to digital converter A receives a signal H from the ODU 1 and the analog to digital converter B receives a signal H' and noise from the ODU 2. The signal quality deteriorates due to cross polarization interference cancellation by the canceller A. The signal not processed by cross polarization interference cancellation is of good quality after it is processed by an equalization unit B, and is selectively received by the synchronization synthesis unit A. If the signal selectively received by the synchronization synthesis unit A changes, the synchronization synthesis unit A performs delay alignment on the selectively received signal according to the first frame synchronization state signal and the second frame synchronization state signal to implement lossless switching in the selective receiving process. Delay alignment may be implemented by adjusting a first-in first-out memory.

The microwave device 2 is used as an example. An analog to digital converter C receives a signal from the ODU 2 and an analog to digital converter D receives a signal from the ODU 1. After the two signals pass through a forward filter C and a forward filter D respectively, cross polarization interference cancellation is performed by a canceller C to acquire a first receive signal after cross polarization interference cancellation. A frame synchronization module C performs vertical polarization V frame synchronization on the first receive signal to acquire a first frame synchronization state signal and the first receive signal processed by frame synchronization. A phase noise immunization module C performs phase noise immunization on the first receive signal processed by frame synchronization.

Quality evaluation is performed on the first receive signal processed by phase noise immunization to acquire a first signal quality signal. The first frame synchronization state signal, the first signal quality signal, and the first receive signal processed by phase noise immunization are sent to a synchronization synthesis unit C. The analog to digital converter C receives a signal from the ODU 2, and the signal is processed by the forward filter C to acquire a second receive signal. A frame synchronization module D performs vertical polarization V frame synchronization on the second receive signal to acquire a second frame synchronization state signal and the second receive signal processed by frame synchronization.

A phase noise immunization module D performs phase noise immunization on the second receive signal processed by frame synchronization. Quality evaluation is performed on the second receive signal processed by phase noise immunization to acquire a second signal quality signal. The second frame synchronization state signal, the second signal quality signal, and the second receive signal processed by phase noise immunization are sent to the synchronization synthesis unit C.

The synchronization synthesis unit C selectively receives, according to the first frame synchronization state signal, the first signal quality signal, the second frame synchronization state signal, and the second signal quality signal, the first receive signal processed by phase noise immunization and the second receive signal processed by phase noise immunization, and performs delay alignment on a selectively received signal according to the first frame synchronization state signal and the second frame synchronization state signal to implement lossless switching in a selective receiving process.

In the normal case, the signal that the analog to digital converter C receives from the ODU 2 is V+H' and the signal that the analog to digital converter D receives from the ODU 1 is H+V'. The signal processed by cross polarization interference cancellation is of good quality after it is processed by an equalization unit C, and is selectively received by the synchronization synthesis unit C.

If the microwave device 4 is faulty, that is, the IDU 4 or the ODU 4 may be faulty, the signal received by the microwave device 1 is an H polarized wave and the signal received by the microwave device 2 is an H' polarized wave and noise. The analog to digital converter C receives a signal H' and noise from the ODU2 and the analog to digital converter D receives a signal H from the ODU1. If the frame synchronization C fails to perform vertical polarization V frame synchronization on the first receive signal and the frame synchronization D fails to perform vertical polarization V frame synchronization on the second receive signal, the frame synchronization D performs horizontal polarization H frame synchronization on the second receive signal; and if synchronization is successful, a transmission function of the microwave device 2 is disabled.

In the normal case, the microwave device 1 and the microwave device 2 send a polarized wave to the microwave device 3 and the microwave device 4. The microwave device 1 sends an H polarized wave and the microwave device 2 sends a V polarized wave. The signal received by the microwave device 3 includes the H polarized wave and a co-channel interference signal V', that is, H+V'. The signal received by the microwave device 4 includes the V polarized wave and a co-channel interference signal H', that is, V+H'. The microwave device 3 and the microwave device 4 send the received signal to each other and use the mutually sent signal to perform cross polarization interference cancellation.

If the microwave device 4 is faulty, the microwave device 3 cannot receive an interference cancellation signal from the microwave device 4, and therefore may fail to correctly parse an H signal. In the embodiment of the present invention, the microwave device 2 determines that the microwave device 4 is faulty and disables the sending function of the microwave device 2 so that no V polarized wave is sent. The signal received by the microwave device 3 has no interference signal from the V polarized wave, and therefore the H signal can be correctly parsed when no interference cancellation signal is received from the microwave device 4.

In the embodiment of the present invention, the canceller A of the microwave device 1 performs cancellation incorrectly because the microwave device 4 is faulty. The synchronization synthesis unit A may selectively receive, according to a frame synchronization state and signal quality, the signal not processed by cancellation, so that the H polarized wave may be correctly parsed. Furthermore, delay alignment is performed in a switching process, which may ensure lossless switching and a customer benefit. The microwave device 2 determines, according to the frame synchronization state, that the microwave device 4 is faulty and disables the sending function of the microwave device 2. This ensures that the microwave device 3 can correctly parse a horizontal polarized wave in a case where an interference cancellation signal fails to be received from the microwave device 4, thereby preventing a single point failure of an XPIC protection group from affecting a service of the entire XPIC protection group.

Figure 3:
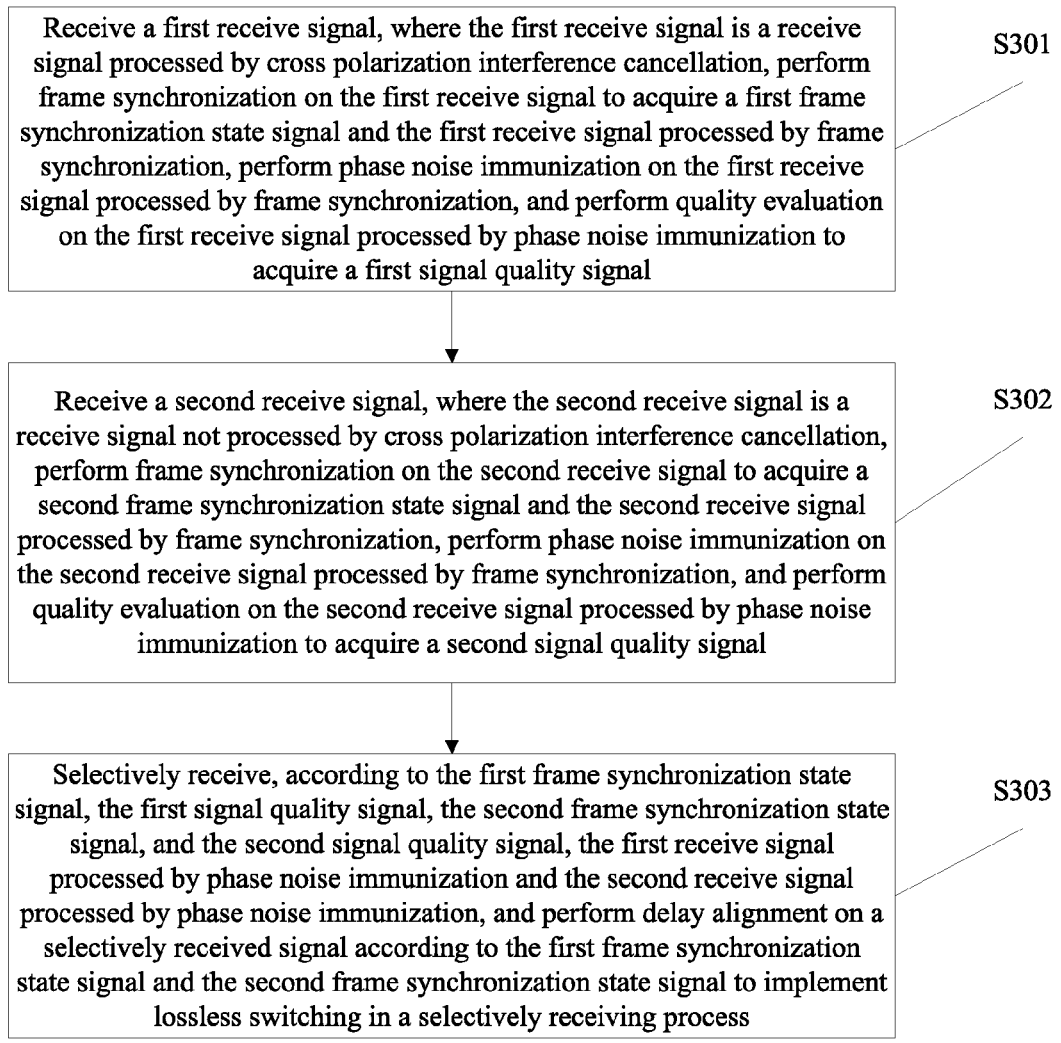
FIG. 3 is a schematic flowchart of a method for receiving a co-channel dual polarized receive signal according to an embodiment of the present invention.

FIG. 3 is a schematic flowchart of a method for receiving a co-channel dual polarized receive signal according to an embodiment of the present invention. The method includes the following steps.

S301. Receive a first receive signal, where the first receive signal is a receive signal processed by cross polarization interference cancellation, perform frame synchronization on the first receive signal to acquire a first frame synchronization state signal and the first receive signal processed by frame synchronization, perform phase noise immunization on the first receive signal processed by frame synchronization, and perform quality evaluation on the first receive signal processed by phase noise immunization to acquire a first signal quality signal.

S302. Receive a second receive signal, where the second receive signal is a receive signal not processed by cross polarization interference cancellation, perform frame synchronization on the second receive signal to acquire a second frame synchronization state signal and the second receive signal processed by frame synchronization, perform phase noise immunization on the second receive signal processed by frame synchronization, and perform quality evaluation on the second receive signal processed by phase noise immunization to acquire a second signal quality signal.

S303. Selectively receive, according to the first frame synchronization state signal, the first signal quality signal, the second frame synchronization state signal, and the second signal quality signal, the first receive signal processed by phase noise immunization and the second receive signal processed by phase noise immunization, and perform delay alignment on a selectively received signal according to the first frame synchronization state signal and the second frame synchronization state signal to implement lossless switching in a selective receiving process.

The performing frame synchronization on the first receive signal specifically includes: performing horizontal polarization H frame synchronization on the first receive signal; and the performing frame synchronization on the second receive signal specifically includes: performing horizontal polarization H frame synchronization on the second receive signal.

If horizontal polarization H frame synchronization fails to be performed on the first receive signal and horizontal polarization H frame synchronization fails to be performed on the second receive signal, vertical polarization V frame synchronization is performed on the second receive signal; and if synchronization is successful, a sending function of a microwave device for receiving the first receive signal and the second receive signal is disabled.

The performing frame synchronization on the first receive signal specifically includes: performing vertical polarization V frame synchronization on the first receive signal; and the performing frame synchronization on the second receive signal specifically includes: performing vertical polarization V frame synchronization on the second receive signal.

If vertical polarization V frame synchronization fails to be performed on the first receive signal and vertical polarization V frame synchronization fails to be performed on the second receive signal, horizontal polarization H frame synchronization is performed on the second receive signal; and if synchronization is successful, a sending function of a microwave device for receiving the first receive signal and the second receive signal is disabled.

In the embodiment of the present invention, a first receive signal is received, where the first receive signal is a receive signal processed by cross polarization interference cancellation, frame synchronization is performed on the first receive signal to acquire a first frame synchronization state signal and the first receive signal processed by frame synchronization, phase noise immunization is performed on the first receive signal processed by frame synchronization, and quality evaluation is performed on the first receive signal processed by phase noise immunization to acquire a first signal quality signal.

A second receive signal is received, where the second receive signal is a receive signal not processed by cross polarization interference cancellation, frame synchronization is performed on the second receive signal to acquire a second frame synchronization state signal and the second receive signal processed by frame synchronization, phase noise immunization is performed on the second receive signal processed by frame synchronization, and quality evaluation is performed on the second receive signal processed by phase noise immunization to acquire a second signal quality signal;

and the first receive signal processed by phase noise immunization and the second receive signal processed by phase noise immunization are selectively received according to the first frame synchronization state signal, the first signal quality signal, the second frame synchronization state signal, and the second signal quality signal, and delay alignment is performed on a selectively received signal according to the first frame synchronization state signal and the second frame synchronization state signal to implement lossless switching in a selective receiving process. The second receive signal is a receive signal not processed by cross polarization interference cancellation. If a cross polarization interference cancellation error occurs due to a microwave device fault, a microwave device selectively receives the receive signal not processed by cross polarization interference cancellation and performs delay alignment, thereby implementing lossless switching in the selective receiving process.

Through the description of the foregoing embodiments, a person skilled in the art may clearly understand that the embodiments of the present invention may be implemented by software and a necessary general hardware platform or by hardware only. Based on such an understanding, the technical solutions in the embodiments of the present invention essentially, or the parts contributing to the prior art may be implemented in the form of a software product. The computer software product is stored in a storage medium and includes several instructions for instructing a computer device (which may be a personal computer, a server, a network device, or the like) to perform the methods described in the embodiments of the present invention.

The foregoing embodiments are merely exemplary embodiments of the present invention and not intended to limit the protection scope of the present invention. Any equivalent variation based on the present invention shall fall within the scope of the present invention.

What is claimed is:

1. A co-channel dual polarized microwave device, comprising:
a synchronization synthesis unit;
a first equalization unit; and
a second equalization unit;
wherein the first equalization unit is configured to receive a first receive signal that is a receive signal processed by cross polarization interference cancellation, to perform frame synchronization on the first receive signal to acquire a first frame synchronization state signal and the first receive signal processed by frame synchronization, to perform phase noise immunization on the first receive signal processed by frame synchronization, to perform quality evaluation on the first receive signal processed by phase noise immunization to acquire a first signal quality signal, and to send the first frame synchronization state signal, the first signal quality signal, and the first receive signal processed by phase noise immunization to the synchronization synthesis unit; and
wherein the second equalization unit is configured to receive a second receive signal that is a receive signal not processed by cross polarization interference cancellation, to perform frame synchronization on the second receive signal to acquire a second frame synchronization state signal and the second receive signal processed by frame synchronization, to perform phase noise immunization on the second receive signal processed by frame synchronization, to perform quality evaluation on the second receive signal processed by phase noise immunization to acquire a second signal quality signal, and to send the second frame synchronization state signal, the second signal quality signal, and the second receive signal processed by phase noise immunization to the synchronization synthesis unit; and wherein the synchronization synthesis unit is configured to selectively receive, according to the first frame synchronization state signal, the first signal quality signal, the second frame synchronization state signal, and the second signal quality signal, the first receive signal processed by phase noise immunization and the second receive signal processed by phase noise immunization, and to perform delay alignment on a selectively received signal according to the first frame synchronization state signal and the second frame synchronization state signal to implement lossless switching in a selective receiving process.

2. The microwave device according to claim 1, wherein the first equalization unit is configured to perform horizontal polarization H frame synchronization on the first receive signal and the second equalization unit is configured to perform horizontal polarization H frame synchronization on the second receive signal.

3. The microwave device according to claim 1, wherein the first equalization unit is configured to perform vertical polarization V frame synchronization on the first receive signal and the second equalization unit is configured to perform vertical polarization V frame synchronization on the second receive signal.

4. The microwave device according to claim 2, wherein, when the first equalization unit fails to perform horizontal polarization H frame synchronization on the first receive signal and the second equalization unit fails to perform horizontal polarization H frame synchronization on the second receive signal, the second equalization unit performs vertical polarization V frame synchronization on the second receive signal, and when synchronization is successful, a sending function of the microwave device is disabled.

5. The microwave device according to claim 3, wherein, when the first equalization unit fails to perform vertical polarization V frame synchronization on the first receive signal and the second equalization unit fails to perform vertical polarization V frame synchronization on the second receive signal, the second equalization unit performs horizontal polarization H frame synchronization on the second receive signal, and when synchronization is successful, a sending function of the microwave device is disabled.

6. A method for receiving a co-channel dual polarized receive signal, the method comprising:

receiving a first receive signal, wherein the first receive signal is a receive signal processed by cross polarization interference cancellation;

performing frame synchronization on the first receive signal to acquire a first frame synchronization state signal and the first receive signal processed by frame synchronization;

performing phase noise immunization on the first receive signal processed by frame synchronization;

performing quality evaluation on the first receive signal processed by phase noise immunization to acquire a first signal quality signal;

receiving a second receive signal, wherein the second receive signal is a receive signal not processed by cross polarization interference cancellation;

performing frame synchronization on the second receive signal to acquire a second frame synchronization state signal and the second receive signal processed by frame synchronization;

performing phase noise immunization on the second receive signal processed by frame synchronization;

performing quality evaluation on the second receive signal processed by phase noise immunization to acquire a second signal quality signal;

selectively receiving, according to the first frame synchronization state signal, the first signal quality signal, the second frame synchronization state signal, and the second signal quality signal, the first receive signal processed by phase noise immunization and the second receive signal processed by phase noise immunization; and performing delay alignment on a selectively received signal according to the first frame synchronization state signal and the second frame synchronization state signal to implement lossless switching in a selective receiving process.

7. The method according to claim 6, wherein performing frame synchronization on the first receive signal comprises performing horizontal polarization H frame synchronization on the first receive signal; and wherein performing frame synchronization on the second receive signal comprises performing horizontal polarization H frame synchronization on the second receive signal.

8. The method according to claim 6, wherein performing frame synchronization on the first receive signal comprises performing vertical polarization V frame synchronization on the first receive signal; and wherein the performing frame synchronization on the second receive signal comprises performing vertical polarization V frame synchronization on the second receive signal.

9. The method according to claim 7, wherein, when horizontal polarization H frame synchronization fails to be performed on the first receive signal and horizontal polarization H frame synchronization fails to be performed on the second receive signal, vertical polarization V frame synchronization is performed on the second receive signal.

10. The method according to claim 9, wherein, synchronization is successful, a sending function of a microwave device for receiving the first receive signal and the second receive signal is disabled.

11. The method according to claim 8, wherein, when vertical polarization V frame synchronization fails to be performed on the first receive signal and vertical polarization V frame synchronization fails to be performed on the second receive signal, horizontal polarization H frame synchronization is performed on the second receive signal.

12. The method according to claim 11, wherein, when synchronization is successful, a sending function of a microwave device for receiving the first receive signal and the second receive signal is disabled.

* * * * *